March 3, 1959 C. R. FOSTER 2,876,431
SIGNAL SYSTEM FOR VEHICLES
Filed Aug. 22, 1955

INVENTOR.
Claude R. Foster
BY
McGrew & Edwards
ATTORNEYS

2,876,431

SIGNAL SYSTEM FOR VEHICLES

Claude R. Foster, Denver, Colo.

Application August 22, 1955, Serial No. 529,866

2 Claims. (Cl. 340—81)

This invention relates to warning signal systems for motor vehicles and particularly to such systems of the type which are effective to indicate to a following vehicle the release of the throttle control of the vehicle engine.

The invention is particularly applicable to motor vehicle signal systems which include turn indicating signals of the flashing light type, and is an improvement on the invention disclosed in my co-pending application Serial Number 463,569, filed October 20, 1954.

It is an object of this invention to provide an improved control for producing a flashing signal when the throttle control of a motor vehicle is released and which is of simple construction and positive in action.

It is another object of this invention to provide an improved flashing signal control for indicating release of the throttle of a motor vehicle which may be operated without causing confusion with other signals such as turn indicating signals.

Further objects and advantages of this invention will become apparent as the following description proceeds and the features of novelty which characterize the invention will be pointed out with particularity in the claims annexed to and forming a part of this specification.

Briefly, in carrying out the objects of this invention in one embodiment, a motor vehicle signal system which includes a pair of stop lights at the rear of the vehicle and also a turn indicating mechanism whereby either light may be operated intermittently is provided with a device actuated upon release of the throttle control of the engine to produce flashing signals of both lights provided neither the stop light signal nor the turn signal has been actuated. The auxiliary control comprises a switch and a flashing unit connected in shunt to the brake pedal actuated switch so that it may control the lights when the brake pedal switch is open; the switch of the auxiliary control remains open as long as the throttle control is being used, however, upon the release of the throttle control the switch is closed and the flashing unit operates. Should the turn signal have been operated so that only one light is in series with the flashing unit a release of the throttle produces a steady signal on the signal light opposite the turn signal. This effect is secured by rendering the auxiliary flashing unit effective to produce a flashing signal only when both stop lights are energized.

Figure 1:
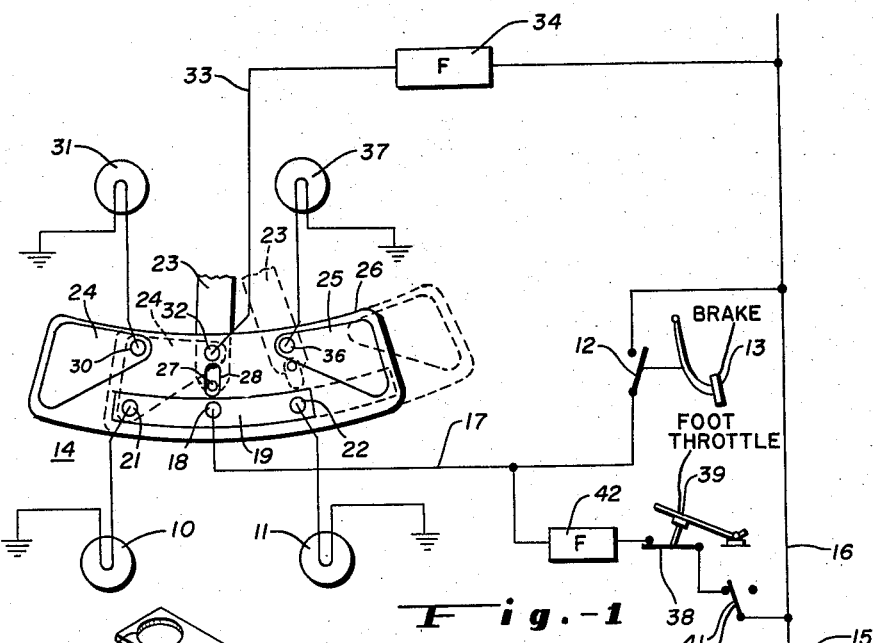
Figure 2:
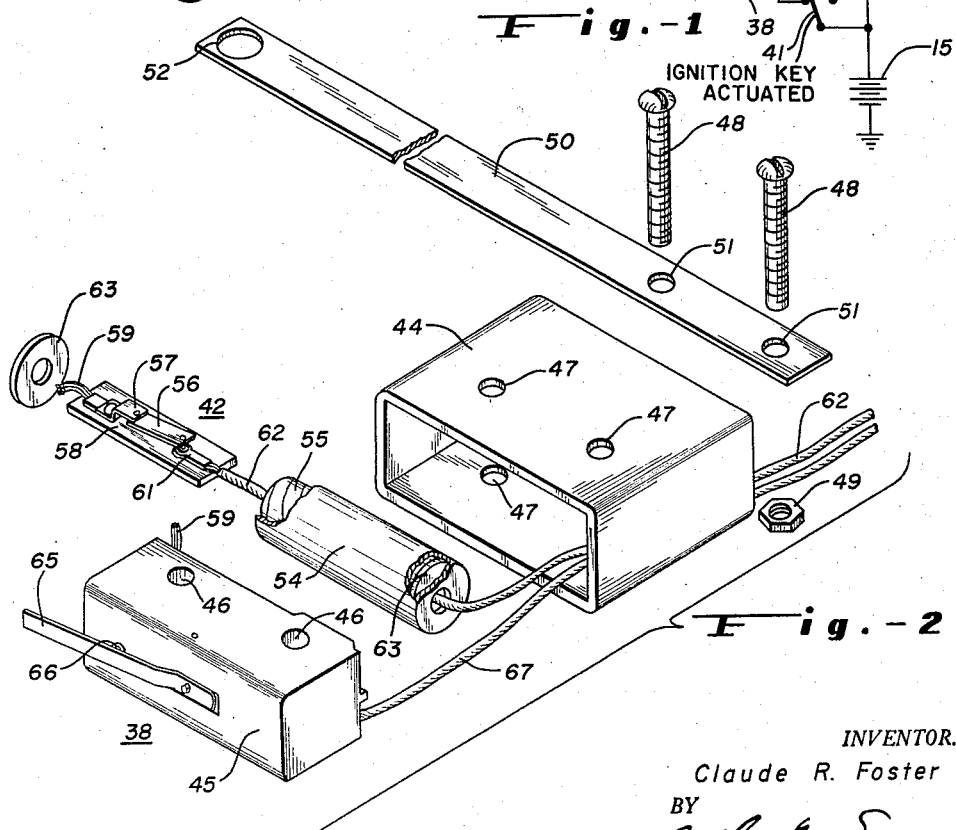

For a better understanding of the invention reference may be had to the accompanying drawing in which:

Fig. 1 is a schematic circuit diagram of a vehicle signal system embodying the invention; and Fig. 2 is an exploded detail view of the throttle actuated flashing control.

Referring now to the drawing, the control system shown in Fig. 1 is arranged to energize two stop lights 10 and 11 to produce stop signals under the control of a switch 12 actuated by a brake lever 13 and to provide a flashing turn signal on the side toward which the turn is to be made under control of a turn indicator switch 14. During the normal operation of the motor vehicle the switch 14 is in its central position as indicated by the full lines, and when the switch 12 is closed a circuit is set up from a storage battery 15 through a supply line 16, the switch 12, a line 17, a stationary contact 18 and a movable bar 19 for the switch 14; the bar 19 engages stationary contacts 21 and 22 which are connected to the lights 10 and 11, respectively. The other sides of the lights 10 and 11 are grounded so that the circuit returns to the battery 15. When it is desired to indicate that the vehicle is about to make a turn, a switch 14 is actuated by movement of a lever or operating member 23 which may for example move the switch to the right as indicated by the dotted line position. The bar 19 and two triangular plates 24 and 25 are mounted on an insulating support 26, a pin 27 on the lever engages a slot 28 in the plate to move the bar and plates simultaneously. When the switch 14 is moved to the right as indicated the triangular plate 24 engages a contact 21, the bar 19 having moved away therefrom, and also engages a contact 30 connected to a pilot lamp 31 and a stationary contact 32 connected by a lead 33 to a flashing unit 34 the other side of which is connected to the supply line 16. It will thus be seen that the plate 24 connects the three contacts 21, 30 and 32 and provides a circuit from the supply line 16 through the flashing unit 34 and then through the stop light 10 and the pilot light 31 in parallel; the action of the flashing unit causes intermittent operation of both lights so that the light 10 at the rear of the vehicle and the pilot light 31 indicate that a turn to the side designated by the light 10 is about to be made. When the bar 19 and plate 25 move to the right as indicated by the dotted line positions the bar 19 connects only the contacts 18 and 22 and the plate 25 lies out of engagement with any contacts. When a reverse turn is to be made the lever 23 is actuated to move the plate 26 to the left from its full line position as shown in Fig. 1 whereupon the plate 24 is disengaged from all contacts and the bar 19 connects the contacts 18 and 21. The plate 25 now connects the contacts 32 and 22 and a contact 36 to which a pilot light 37 is connected. This connects the flashing unit 34 to produce a flashing signal of the lights 11 and 37 in a manner similar to the operation of the lights 10 and 31 on movement of the switch to its right-hand position. It will thus be apparent that a flashing signal indicating a turn to either side may be provided, and, then the brake actuated switch 12 can energize only the stop light on the side opposite that on which the turn indication is being registered.

This arrangement of the signal system to provide coordinated indication of the stop light signal and turn signals will be recognized as one arrangement in use at the present time. In addition to the braking and turn signals there is provided a third signal circuit which includes a normally closed switch 38 arranged to be opened upon actuation of the throttle of the vehicle indicated at 39 so that whenever the throttle is depressed the switch 38 is opened. The switch 38 is connected in a series circuit between the lines 16 and 17 so that it shunts the switch 12. The series circuit includes a manually operated switch 41, which, for example, may be actuated by the ignition key of the vehicle and a flashing unit 42 which provides an intermittent signal upon closing of the switch 38 provided that both the lights 10 and 11 are connected by the bar 19. It will thus be apparent that whenever the vehicle is in normal operation and the operator takes his foot from the pedal 39 a flashing signal is provided to indicate the accompanying slow down of the vehicle. Should the brake 13 be operated when the switch 12 is closed, the shunting of the circuit of the flasher 42 will result in the steady stop signal required upon operation of the brake. Whenever the turn signal has been operated and the switch 14 is in either its right or its left hand positions the flashing unit 42 is connected to only one of the lamps 10 and 11 this being the lamp other than that which is giving the turn signal. In order to prevent confusion upon release of the throttle on approaching a turn the control is arranged so that closing of the switch 38 will result in a steady light on the single lamp connected thereto rather than a flashing signal during the operation of the turn signal. In this manner flashing of both stop lights and loss of the turn signal indication is avoided. In order to prevent the flashing operation on closure of the switch 38 the intermittent switch unit 42 is designed so that it will produce a steady signal until the current passing therethrough is sufficiently great to cause intermittent operation. It will be noted that the lamps 10 and 11 are connected in parallel when the bar 19 connects the three contacts 18, 21 and 22; the flashing unit 42 is designed to operate upon the current flowing through the line 17 when the two lights 10 and 11 are connected in parallel, when only one of the lights is connected less current flows through the unit 42 which then remains closed to provide a steady signal. The flashing unit 42 is preferably a thermally-actuated device which may include a bi-metallic element in series in the circuit and acting as a switch member; this element is constructed to be normally closed. Upon heating, the element tends to move away from its closed position and is preferably made to have a snap acting characteristic so that upon a predetermined amount of heating it will snap away from the closed position whereupon it will cool and snap back to the closed position thereby producing the intermittent operation. Intermittent actuating devices of this general type are known in the art. In the present device the design of the bi-metal blade is such that the current through a single lamp will be insufficient to cause heating of the blade to a temperature such that it will snap open, thus the switch will remain closed when current for energizing a single light is passing therethrough. When current sufficient for two lights in parallel passes through the unit 42 it is sufficient to heat the unit and cause it to break its contact thereby producing the intermittent action. It is thus apparent that by selecting the operating characteristics of the intermittent flashing unit the desired characteristics are secured for operation in the manner described above.

A single assembly including the switch 38 and the flashing unit 42 may be provided for convenience in mounting on the motor vehicle; and an assembly of this type is shown in Fig. 2. The unit comprises a casing 44 which is open at one end, the opening being of such dimensions that it may be closed by the housing of the switch 38 indicated at 45. Flashing unit 42 is first placed within the casing 44 at the bottom thereof and the switch 38 then inserted in position. The switch and the casing 44 are provided with corresponding holes 46 and 47, respectively, which pass entirely through the switch housing and the casing so that a pair of machine screws 48 may be passed through the assembled parts to hold them in position, suitable nuts 49, one of which is shown, being provided for the purpose. In addition a mounting strap 50 may be provided and secured in position by the screws 48 which pass through holes 51 in the strap. The other end of the strap is provided with a hole or recess 52 to facilitate its mounting on the motor vehicle in a position adjacent the throttle mechanism. As shown in Fig. 2 the flashing unit 42 comprises a cylindrical outer casing 54 having an insulated liner 55 within which the mechanism of the flashing unit is mounted; the flasher includes a bi-metallic element 56 secured by a strap 57 to an insulated mounting strip 58, a lead 59 being secured to the strip with the strap 57. The element 56 is arranged in contact with a stationary contact member 61 connected to the other lead indicated at 62. When the element 56 is heated sufficiently it moves away from the contact 61 thereby opening the circuit. The element 56 is preferably of the snap acting type so that its "on" and "off" periods are distinct and no fluttering and brushing of the contacts will occur which otherwise would cause irregular signals. Insulating washers 63 are provided at the two ends of the mounting strip 58 and enclose the ends of the insulated tube 55. The lead 59 has been illustrated as being broken the other end being connected to the switch 38. The switch 38 is provided with an actuating lever or finger 65 which extends beyond the end of the switch and when the switch is in position in the casing 44 the finger 65 is in a position readily accessible for actuation by a portion of the throttle mechanism of the vehicle. The switch 38 is of the miniature switch type and is normally closed it being opened by pressure on a button 66 which extends out of the casing 45 into engagement with the finger 65. When the switch 38 is closed a circuit is provided from a lead 67 through the switch 38 and a lead 59 to the flashing element 56 and thence to the lead 62. The leads 62 and 67 pass through an opening (not shown) in the bottom of the casing 44. When the unit has been assembled the flashing unit 42 is retained within the casing 44 by the housing 45 of the switch 38 which acts as a closure for the casing, and the entire assembly is a single unit easily mounted in the required position adjacent the throttle actuating mechanism. It will readily be understood that the unit may be mounted in any position where a portion of the throttle actuating mechanism is available to press the finger 65 and open the switch 38 upon actuation of the throttle control and to release the finger 65 and allow the switch to open when the throttle control is released.

It is readily apparent from the foregoing that the control arrangement is simple and effective for assuring the giving of a flashing signal upon release of the throttle control, and at the same time assuring that in the event only one of the stop lights is in the circuit a steady signal will be given; thus, if one of the lights is cut out as upon operation of the turn signal, a steady light rather than a flashing light will be given upon release of the throttle mechanism.

While the invention has been illustrated in connection with a specific circuit arrangement and structural details of the mounting unit have been illustrated various modifications will occur to those skilled in the art, therefore it is not desired that the invention be limited to the details of construction and circuit arrangement illustrated and described and it is intended by the appended claims to cover all modifications which fall within the spirit and scope of the invention.

I claim:

1. In a motor vehicle signal light system including a pair of stop lights one on each side at the rear of the vehicle, means including a circuit dependent upon operation of the vehicle brakes for connecting said lights to be energized in parallel, said circuit including a normally open switch connected to be closed upon operation of the brakes, selector means in said circuit for alternatively disconnecting either of said lights whereby only one of said lights is energized by closing of said switch when said selector means is actuated, flashing signal means including an intermittent flashing unit and a normally closed switch connected in series with one another and in shunt with said normally open switch for energizing said stop lights to effect flashing signals, means dependent upon actuation of the vehicle throttle for opening said normally closed switch whereby said unit is energized only when the throttle is released and whereby said unit is short circuited on operation of the vehicle brake to close said normally open switch, said intermittent control unit comprising a pair of normally closed switch contacts and means dependent upon a predetermined flow of current through said contacts for separating said contacts, said current dependent means being effective to open said contacts upon the amount of current normally flowing through both said lights but being ineffective to separate said contacts upon the amount of current normally flowing through a single light whereby upon operation of said selector means to disconnect one of said lights the other light will be energized continuously upon release of the throttle.

2. In a motor vehicle signal light system including a pair of stop lights one on each side at the rear of the vehicle, means including a circuit dependent upon operation of the vehicle brakes for connecting said lights to be energized in parallel, said circuit including a normally open switch connected to be closed on operation of the brakes, turn indicator means including a first intermittent contact unit and relatively movable switch parts for connecting said stop light circuit normally to energize both said stop lights and for selectively disconnecting either of said stop lights and for connecting the disconnected light to said intermittent contact unit, said turn indicator means being connected in said circuit between said normally open switch and said stop lights, flashing signal means including a second intermittent flashing unit and a normally closed switch connected in series with one another and in shunt with said normally open switch for energizing said stop lights to effect flashing signals, means dependent upon actuation of the vehicle throttle for opening said normally closed switch whereby said unit is energized only when the throttle is released and whereby said unit is short circuited on operation of the vehicle brake to close said normally open switch, said intermittent control unit comprising a pair of normally closed switch contacts and means dependent upon a pre-determined flow of current through said contacts for separating said contacts, said current dependent means being effective to open said contents upon the amount of current normally flowing through both of said lights but being ineffective to separate said contacts on the amount of current normally flowing through a single light whereby upon operation of said turn indicator means to disconnect one of said lights the other light will be energized continuously upon release of the throttle.

References Cited in the file of this patent

UNITED STATES PATENTS

| | | |
|---|---|---|
| 2,172,068 | Murray | Sept. 5, 1939 |
| 2,572,094 | Bailey | Oct. 23, 1951 |
| 2,657,293 | Hopkins | Oct. 27, 1953 |
| 2,667,550 | Litucky | Jan. 26, 1954 |
| 2,678,978 | Reynolds | May 18, 1950 |